US007716848B1

(12) United States Patent  
Calvey

(10) Patent No.: US 7,716,848 B1
(45) Date of Patent: May 18, 2010

(54) SQUARE CHECK TAPE MEASURE DEVICE

(76) Inventor: Ryan Calvey, 4724 Chardonnay La., Port Orange, FL (US) 32129

( * ) Notice: Subject to any disclaimer, the term of this patent is extended or adjusted under 35 U.S.C. 154(b) by 222 days.

(21) Appl. No.: 11/983,677

(22) Filed: Nov. 9, 2007

Related U.S. Application Data

(60) Provisional application No. 60/860,429, filed on Nov. 21, 2006.

(51) Int. Cl.
G01B 3/10 (2006.01)
(52) U.S. Cl. .......................................... 33/758; 33/759
(58) Field of Classification Search .................. 33/758, 33/755, 759
See application file for complete search history.

(56) References Cited

U.S. PATENT DOCUMENTS

| 1,145,244 | A | * | 7/1915 | Hoffmann ..................... 33/662 |
| 4,155,168 | A | * | 5/1979 | DuBois ........................ 33/32.5 |
| 5,291,664 | A |  | 3/1994 | Pinney, Jr. et al. |
| 5,295,308 | A | * | 3/1994 | Stevens et al. ................ 33/770 |
| 5,845,412 | A |  | 12/1998 | Arcand |
| 6,082,014 | A | * | 7/2000 | Beyers ......................... 33/414 |
| 6,115,931 | A |  | 9/2000 | Arcand |
| 6,338,204 | B1 | * | 1/2002 | Howle .......................... 33/758 |
| 6,470,589 | B2 | * | 10/2002 | Simmons ...................... 33/759 |
| 6,637,126 | B2 | * | 10/2003 | Balota ........................ 33/770 |
| 6,691,426 | B1 | * | 2/2004 | Lee et al. ...................... 33/759 |
| 7,168,182 | B2 | * | 1/2007 | Kilpatrick et al. ............. 33/770 |
| 7,281,340 | B2 | * | 10/2007 | Greally ........................ 33/758 |
| 7,484,313 | B1 | * | 2/2009 | Ogilvie ........................ 33/770 |
| 2002/0029489 | A1 | * | 3/2002 | Murray ........................ 33/755 |

FOREIGN PATENT DOCUMENTS

GB 2450394 A * 12/2008

* cited by examiner

Primary Examiner—Christopher W Fulton
(74) Attorney, Agent, or Firm—Emery L. Tracy

(57) ABSTRACT

A tape measure device for measuring lengths is provided. The tape measure device comprises a housing having a slotted opening. A retractable measuring tape is wound within the housing with the measuring tape having a free end extending through the slotted opening and a secured end secured within the housing and the measuring tape being alternatingly extractable from and receivable into the housing. A viewing slot is formed in the measuring tape. A triangular-shaped tab is secured to the free end of the measuring tape. A rotating mechanism provides rotation of the tab relative to the free end of the measuring tape.

19 Claims, 2 Drawing Sheets

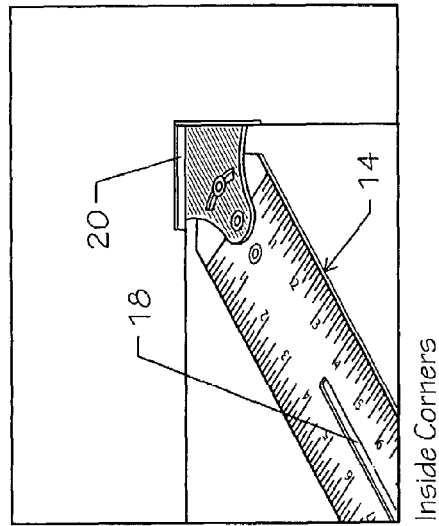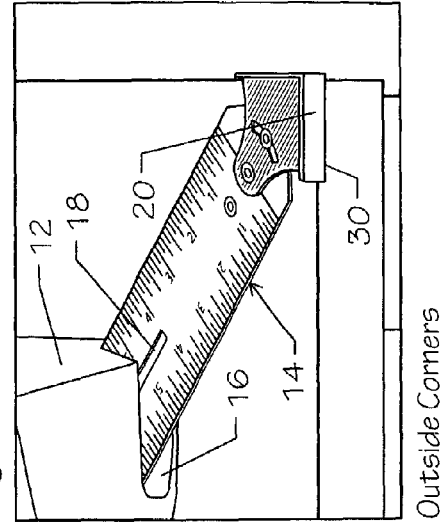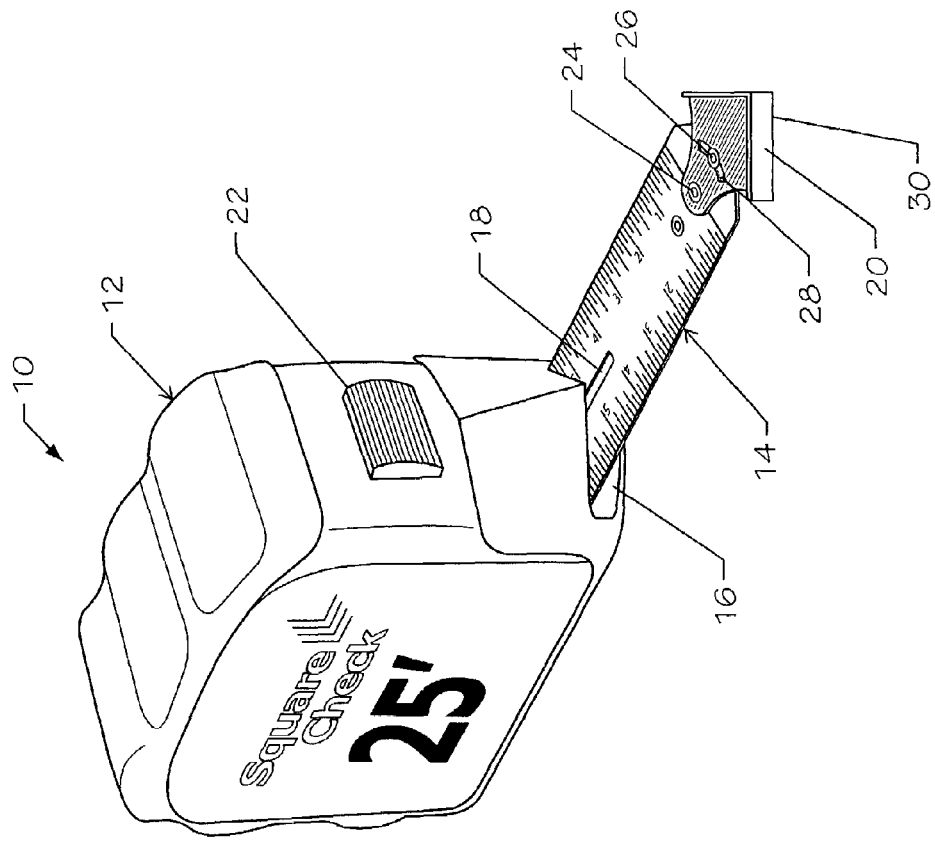

SQUARE CHECK TAPE MEASURE DEVICE

The present application claims benefit of priority of pending provisional patent application Ser. No. 60/860,429, filed on Nov. 21, 2006, entitled "Square Check Tape Measure Device".

BACKGROUND OF THE INVENTION

1. Field of the Invention

This invention relates generally to a tape measure device and, more particularly, the invention relates to a tape measure device having a triangular tab pivotably attached to the end of the tape measure.

2. Description of the Prior Art

One of the most basic tools required for making accurate measurements, a tool that can be used for literally hundreds of applications, is a tape measure. Tape measures provide an accurate means of measurement for virtually any purpose and are available in varying lengths.

Tape measures are made available in versions having tape enclosure casings of durable plastic or metal, with the retractable tape generally being manufactured from spring steel. Carpenters and many other types of tradesmen, cabinetmakers, do-it-yourselfers, and others extensively use tape measures. Although tape measures are very effective measuring tools, anyone that has ever used a tape measure has experienced the problem of trying to check for squareness of a rectangular or diagonal surface with corners, when the starting point is in a corner. The end of a tape measure is squared off on the end and the only way to take an accurate measurement is to have another individual hold the end of the tape in place on the number 1. This problem is frequently experienced in many situations and takes more time than it does when taking measurements without the assistance of another person.

SUMMARY

The present invention is a tape measure device for measuring lengths. The tape measure device comprises a housing having a slotted opening. A retractable measuring tape is wound within the housing with the measuring tape having a free end extending through the slotted opening and a secured end secured within the housing and the measuring tape being alternatingly extractable from and receivable into the housing. A viewing slot is formed in the measuring tape. A triangular-shaped tab is secured to the free end of the measuring tape. A rotating mechanism provides rotation of the tab relative to the free end of the measuring tape.

In addition, the present invention includes a method for measuring the length and squareness of rectangular or diagonal shapes and to assist in the layout of curves such as circles and arcs. The method comprises providing a housing, forming a slotted opening in the housing, winding a retractable measuring tape within the housing with the measuring tape having a free end and a secured end, securing the secured end within the housing, extending the free end through the slotted opening, forming a viewing slot in the measuring tape, securing a triangular shaped tab to the free end of the measuring tape outside the housing, alternatingly extracting the measuring tape from the housing and receiving the measuring tape into the housing, and rotating the tab relative to the free end of the measuring tape.

The present invention further includes a tape measure device for measuring lengths. The tape measure device comprises a housing having a triangular-shaped slotted opening. A retractable measuring tape is wound within the housing with the measuring tape having a free end extending through the slotted opening and a secured end secured within the housing and the measuring tape being alternatingly extractable from and receivable into the housing. A viewing slot is formed along the longitudinal center of the measuring tape. A triangular shaped tab is secured to the free end of the measuring tape. A stationary rivet is secured through the tab and the measuring tape. A secondary rivet is slidably contained within a curved slotted groove formed in the tab allowing the tab to pivot relative to the measuring tape.

BRIEF DESCRIPTION OF THE DRAWINGS

FIG. 1 is a perspective view illustrating a square check tape measure device, constructed in accordance with the present invention;

FIG. 2 is a perspective view illustrating the square check tape measure device, constructed in accordance with the present invention, with the tape measure device measuring from an inside corner;

FIG. 3 is a perspective view illustrating the square check tape measure device, constructed in accordance with the present invention, with the tape measure device measuring from an outside corner;

DETAILED DESCRIPTION OF THE PREFERRED EMBODIMENTS

Figure 4:
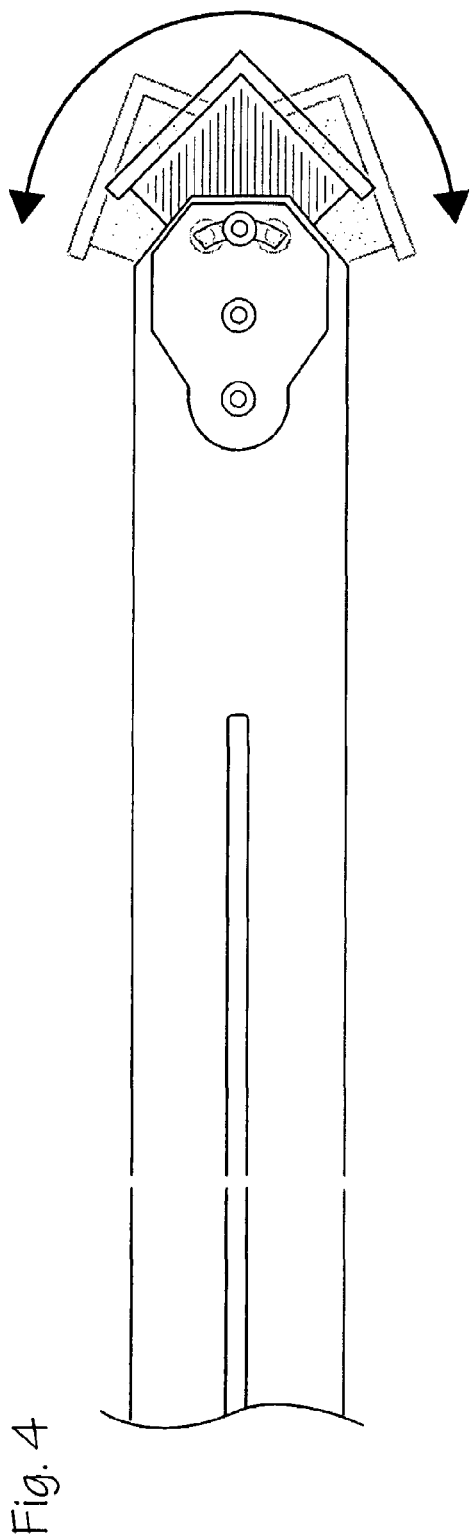
FIG. 4 is a bottom view illustrating the square check tape measure device, constructed in accordance with the present invention, with the rotation of the tab relative to the tape measure.
Figure 5:
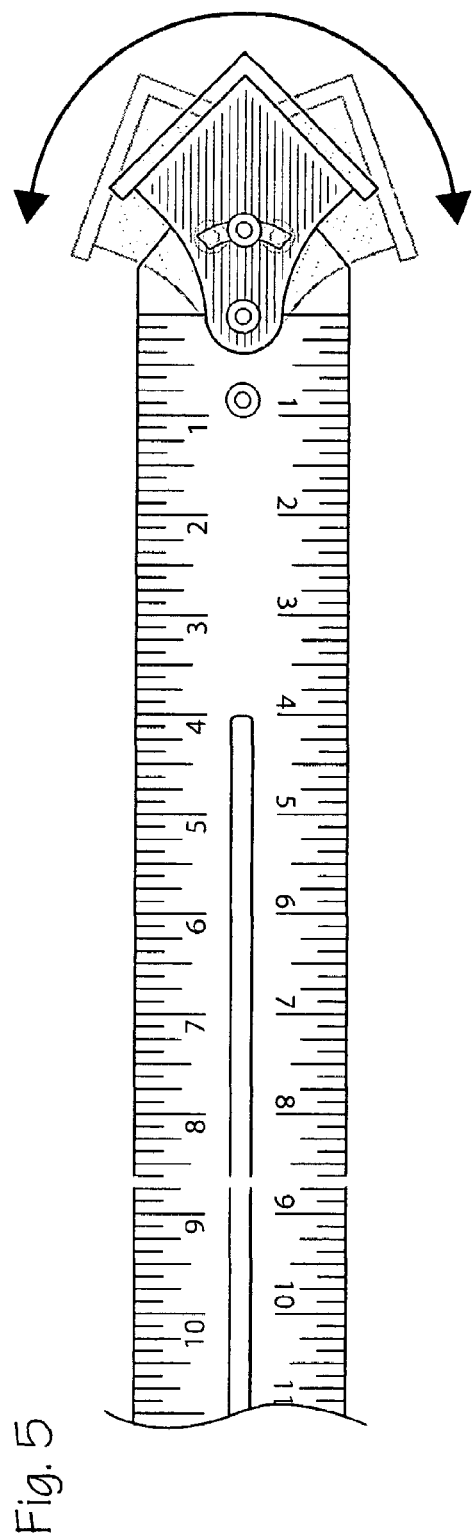
FIG. 5 is a top view illustrating the square check tape measure device, constructed in accordance with the present invention, with the rotation of the tap relative to the tape measure.

As illustrated in FIGS. 1-5, the present invention is a square check tape measure device, indicated generally at 10, for measuring and ensuring true squareness of rectangular and square shapes. The tape measure device 10 includes a housing 12 surrounding a retractable measuring tape 14. The measuring tape 14 can be alternatingly extracted from and received into the housing 12.

Preferably, the housing 12 of the tape measure device 10 of the present invention will be similar in size to a conventional tape measure having approximate dimensions of three (3") inches in height, one and one-half (1½") inches in width, and three (3") inches in depth. The housing 12 is preferably constructed from rust resistant metal although constructing the housing 12 from different materials, i.e., plastic, is within the scope of the present invention. In addition, the housing 12 of the tape measure device 10 is preferably generally rectangular in shape with a rounded top and a slotted opening 16 on one side nearingly adjacent the lower edge. The slotted opening 16 is preferably triangularly-shaped for accepting the triangular-shaped end tab 20 upon retracting.

The measuring tape 14 of the tape measure 10 of the present invention is preferably twenty-five (25') feet in length although having a measuring tape 14 greater than or less than twenty-five (25') feet in length is within the scope of the present invention. Preferably, the measuring tape 14 is constructed from rust resistant, spring steel although constructing the measuring tape 14 from other materials is within the scope of the present invention. The measuring tape 14 is extractable and retractable into the housing 12 through the slotted opening 16.

The measuring tape 14 of the tape measure device 10 of the present invention further includes a clear viewing slot 18 positioned along the center of the measuring tape 14. The viewing slot 18 allows the user to "see through" the measuring tape 14 ensuring precise measurements. The thin viewing slot 18 can run the full length of the measuring tape 14 or in slotted increments preferably starting at least three (3") inches to six (6") inches back from the end tab 20 for strength purposes. The viewing slot 18 is an optional feature providing that the manufacturer's tape is durable enough to accommodate such with a thicker clear plastic coating. It should be noted that the viewing slot 18 can also be a viewing strip of clear material accomplishing the same result as the viewing slot 18.

Preferably, the tape measure device 10 of the present invention further includes a slide-type lever 22 positioned in the approximate center of one side of the housing 12. The lever 22 is slidable in a general downward direction to releasably lock the measuring tape 14 in a desired position and slidable in a general upward direction to release the lock and causing the measuring tape 14 to retract into the housing 12.

In addition, the tape measure device 10 of the present invention preferably includes a durable, steel belt clip (not shown) integrally attached to one side of the housing 12. The belt clip allows a user to clip the tape measure device 10 onto a belt or the like for easy access to the tape measure device 10.

Furthermore, as illustrated in FIGS. 1-5, the tape measure device 10 of the present invention includes a triangular shaped tab 20 secured to the outer end of the measuring tape 14. The tab 20 is attached to the end of the measuring tape 14 by a stationary rivet 24 or the like. A secondary rivet 26 is slidably contained within a slotted groove 28 formed in the tab 20 allowing the tab 20 to pivot relative to the measuring tape 14. It is within the scope of the present invention for the tab 20 to pivot relative to the measuring tape 14 up to ninety (90°) degrees in each direction. In a preferred embodiment, however, the tab 20 pivots relative to the measuring tape 14 approximately forty-five (45°) degrees in each direction.

The tab 20 of the tape measure device 10 of the present invention further features end hooks 30 latchable onto outside corners and inserted into inside corners. The tab 20 allows the tape measure device 10 to swivel to the desired position to accurately measure the distance and squareness of rectangular shapes and to assist in the layout of curves such as circles, arcs, and arches. This provides an advantage over conventional tape measures when other than straight forward measurements are necessary.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A tape measure device for measuring lengths of an object, the tape measure device comprising:
    a housing having a slotted opening;
    a retractable measuring tape wound within the housing, the measuring tape having a free end extending through the slotted opening and a secured end secured within the housing, the measuring tape being alternatingly extractable from and receivable into the housing;
    a triangular shaped tab secured to the free end of the measuring tape; and
    rotating means for providing rotation of the tab relative to the free end of the measuring tape;
    wherein the tab is positionable on and contactable with both edges, at the same time, of an outside corner for measuring any length along any desired angle between the edges of the outside corner; and
    wherein the tab is positionable against and contactable with both walls, at the same time, of an inside corner for measuring any length along any desired angle between the walls of the inside corner.

2. The tape measure device of claim 1 wherein the slotted opening of the housing is triangular-shaped for accepting the triangular-shaped end tab upon retracting.

3. The tape measure device of claim 1 and further comprising:
    a slide-type lever positioned in the approximate center of one side of the housing, the lever slidable in a general downward direction to releasably lock the measuring tape in a desired position and slidable in a general upward direction to release the lock and causing the measuring tape to retract into the housing.

4. The tape measure device of claim 1 wherein the rotating means comprises:
    a stationary rivet through the tab and the measuring tape; and
    a secondary rivet slidably contained within a curved slotted groove formed in the tab allowing the tab to pivot relative to the measuring tape.

5. The tape measure device of claim 4 wherein interaction between the secondary rivet and ends of the curved slotted groove limiting the extent of rotation of the tab.

6. The tape measure device of claim 4 wherein the tab rotates on a non-centrally located axis.

7. The tape measure device of claim 1 wherein the tab pivots relative to the measuring tape up to and including ninety (90°) degrees in each direction toward either edge of the corner.

8. The tape measure device of claim 1 wherein the tab includes end hooks extending in a generally downward direction from the measuring tape, the end hooks positionable on and contactable with the edges, the end hooks insertable into and contactable with the walls.

9. The tape measure device of claim 8 wherein the end hook has an inside surface and an outside surface, the inside surface of the end hook contactable with both edges of the outside corner, the outside surface of the end hook contactable with both walls of the inside corner.

10. The method of claim 8 and further comprising:
    forming end hooks on the tab and extending in a generally downward direction from the measuring tape;
    positioning the end hooks on and contacting the end hooks with the edges; and
    positioning the end hooks against and inserting the end hooks within the walls.

11. The method of claim 10 wherein the end hook has an inside surface and an outside surface, and further comprising:
    contacting the inside surface of the end hook both edges, at the same time, of the outside corner; and
    contacting the outside surface of the end hook with both walls, at the same time, of the inside corner.

12. The method of claim 1 and further comprising:
    pivoting the tab relative to the measuring tape up to and including ninety (90°) degrees in each direction.

13. A method for measuring the length and squareness of rectangular shapes and to assist in the layout of curves such as circles and arcs, the method comprising:
- providing a housing;
- forming a slotted opening in the housing;
- winding a retractable measuring tape within the housing, the measuring tape having a free end and a secured end;
- securing the secured end within the housing;
- extending the free end through the slotted opening;
- securing a triangular shaped tab to the free end of the measuring tape outside the housing;
- alternatingly extracting the measuring tape from the housing and receiving the measuring tape into the housing;
- rotating the tab relative to the free end of the measuring tape;
- positioning the tab on and contacting the tab with both edges, at the same time, of an outside corner;
- measuring any length along any desired angle between the edges of the outside corner;
- positioning the tab against and contacting the tab with both walls, at the same time, of an inside corner; and
- measuring any length along any desired angle between the walls of the inside corner.

14. The method of claim 13 wherein the slotted opening of the housing is triangular-shaped for accepting the triangular-shaped end tab upon retracting.

15. The method of claim 13 and further comprising:
- securing a stationary rivet through the tab and the measuring tape; and
- forming a curved slotted groove in the tab;
- securing a secondary rivet through the slotted groove and the measuring tape; and
- pivoting the tab relative to the measuring tape.

16. The method of claim 15 and further comprising:
- limiting the extent of rotation of the tab with the interaction between the secondary rivet and ends of the curved slotted groove.

17. A tape measure device for measuring lengths, the tape measure device comprising:
- a housing having a triangular-shaped slotted opening;
- a retractable measuring tape wound within the housing, the measuring tape having a free end extending through the slotted opening and a secured end secured within the housing, the measuring tape being alternatingly extractable from and receivable into the housing;
- a triangular shaped tab secured to the free end of the measuring tape;
- a stationary rivet secured through the tab and the measuring tape; and
- a secondary rivet slidably contained within a curved slotted groove formed in the tab allowing the tab to pivot relative to the measuring tape, interaction between the secondary rivet and ends of the curved slotted groove limiting the extent of rotation of the tab.

18. The tape measure device of claim 17 wherein the tab includes end hooks.

19. The tape measure device of claim 17 wherein the end hook has an inside surface and an outside surface, the inside surface of the end hook contactable with both edges, at the same time, of the outside corner, the outside surface of the end hook contactable with both walls, at the same time, of the inside corner.

* * * * *